US 11,176,729 B2

(12) United States Patent
Takahashi

(10) Patent No.: US 11,176,729 B2
(45) Date of Patent: Nov. 16, 2021

(54) THREE-DIMENSIONAL OBJECT DATA GENERATION APPARATUS, THREE-DIMENSIONAL OBJECT FORMING APPARATUS, AND NON-TRANSITORY COMPUTER READABLE MEDIUM

(71) Applicant: FUJIFILM Business Innovation Corp., Tokyo (JP)

(72) Inventor: Tomonari Takahashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 10 days.

(21) Appl. No.: 16/260,001

(22) Filed: Jan. 28, 2019

(65) Prior Publication Data
US 2020/0074718 A1 Mar. 5, 2020

(30) Foreign Application Priority Data
Aug. 30, 2018 (JP) .............................. JP2018-161677

(51) Int. Cl.
*G06T 17/20* (2006.01)
*G06T 15/08* (2011.01)
*G06T 15/00* (2011.01)
*G06T 17/00* (2006.01)

(52) U.S. Cl.
CPC ............ *G06T 15/08* (2013.01); *G06T 15/005* (2013.01); *G06T 17/00* (2013.01); *G06T 17/20* (2013.01)

(58) Field of Classification Search
CPC .......... G06T 15/08; G06T 17/00; G06T 17/20
See application file for complete search history.

(56) References Cited

U.S. PATENT DOCUMENTS

| 7,372,460 B2 | 5/2008 | Usami et al. | |
|---|---|---|---|
| 2010/0125356 A1* | 5/2010 | Shkolnik | B33Y 80/00 700/98 |
| 2014/0324204 A1* | 10/2014 | Vidimce | B29C 67/0088 700/98 |
| 2015/0356787 A1* | 12/2015 | Abe | G06F 3/0346 345/633 |
| 2016/0243760 A1* | 8/2016 | Utsunomiya | B29C 64/386 |

(Continued)

FOREIGN PATENT DOCUMENTS

| JP | 2001357078 | 12/2001 |
|---|---|---|
| JP | 2005038219 | 2/2005 |
| JP | 2016150549 | 8/2016 |

OTHER PUBLICATIONS

Lambrecht, Bram. "Voxelization of boundary representations using oriented LEGO plates." University of California, Berkeley. http://lego.bldesign.org/LSculpt/lambrecht_legovoxels.pdf (2008). (Year: 2008).*

(Continued)

*Primary Examiner* — Ryan McCulley
(74) *Attorney, Agent, or Firm* — JCIPRNET

(57) ABSTRACT

A three-dimensional object data generation apparatus includes a setting unit that sets a basic voxel group defined using at least one voxel in accordance with a shape of a surface of a three-dimensional object on a basis of three-dimensional object data indicating the surface of the three-dimensional object using at least either plural flat surfaces or a curved surface and a generation unit that generates three-dimensional object data in which voxels are set inside the surface on a basis of the basic voxel group.

14 Claims, 14 Drawing Sheets

(56) References Cited

U.S. PATENT DOCUMENTS

| | | | |
|---|---|---|---|
| 2016/0267705 A1* | 9/2016 | O'Leary | G06F 3/04815 |
| 2017/0178388 A1* | 6/2017 | Bisson | G06T 17/00 |
| 2017/0323471 A1* | 11/2017 | Chien | G06T 11/001 |
| 2019/0221034 A1* | 7/2019 | Mason | G06T 7/12 |

OTHER PUBLICATIONS

Song, Peng, et al. "Printing 3D objects with interlocking parts." Computer Aided Geometric Design 35 (2015): 137-148. (Year: 2015).*

* cited by examiner

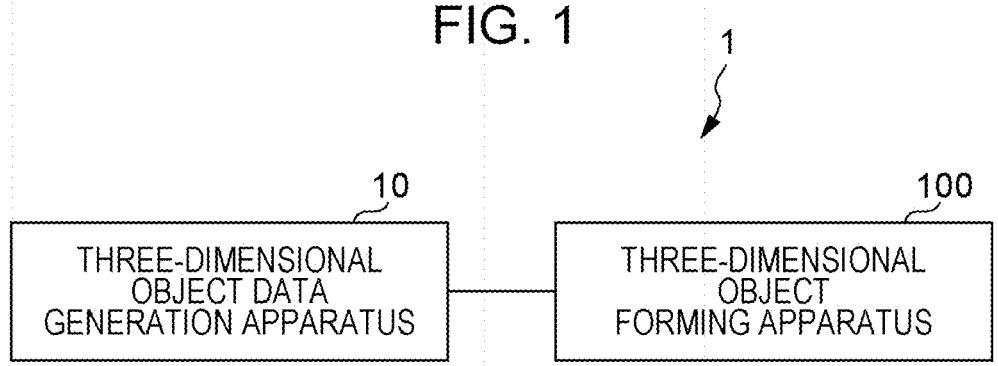
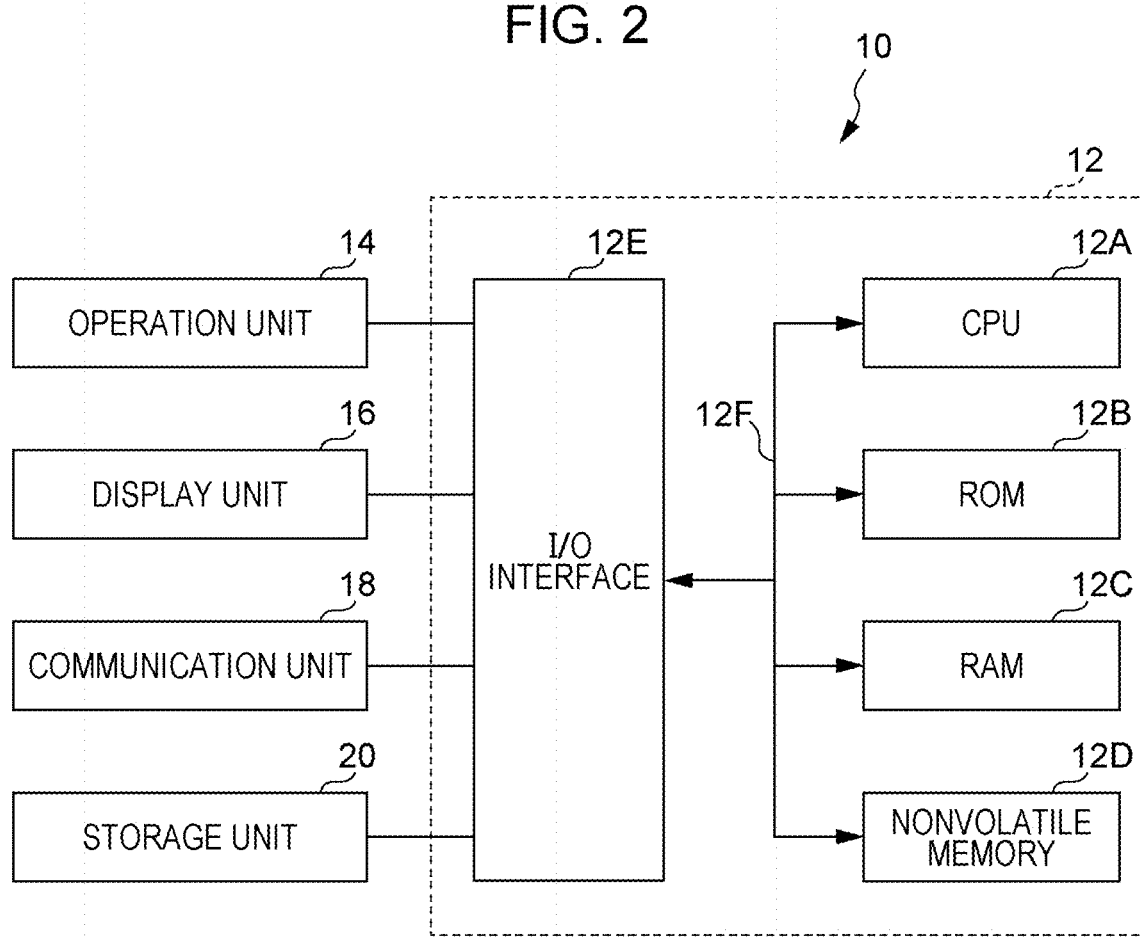

THREE-DIMENSIONAL OBJECT DATA GENERATION APPARATUS, THREE-DIMENSIONAL OBJECT FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-161677 filed Aug. 30, 2018.

BACKGROUND

(i) Technical Field

The present disclosure relates to a three-dimensional object data generation apparatus, a three-dimensional object forming apparatus, and a non-transitory computer readable medium storing a program for generating three-dimensional object data.

(ii) Related Art

Japanese Unexamined Patent Application Publication No. 2005-038219 discloses a method for generating volume data from boundary representation data. The method includes inputting, using an external data input unit, boundary representation data regarding a target to a computer, converting, using a data conversion unit, the boundary representation data into a topological triangular patch, dividing, using an association unit, a space into rectangular parallelepiped cells whose boundary surfaces are perpendicular to one another and associating the rectangular parallelepiped cells with triangles included in the rectangular parallelepiped cells, dividing, using a division arrangement unit, the topological triangular patch floating in the space by the boundary surfaces of the rectangular parallelepiped cells and arranging all the triangles inside the rectangular parallelepiped cells on boundaries, performing, using an edge integration unit, edge integration without changing topology, assigning, using a cell assignment unit, the triangles and vertices of the triangles to the cells on the basis of vertex index data, and setting, using a labeling unit, attribute values of the cells.

Japanese Unexamined Patent Application Publication No. 2001-357078 discloses an object data integration analysis apparatus including a voxel dividing unit that converts three-dimensional first object data created at a design stage into second object data by dividing the three-dimensional first object data by voxels, a second object data display unit that displays second object data only around a selected portion of the first object data, a second object data analysis unit that analyzes the second object data displayed by the second object data display unit, and a first object data/analysis result display unit that projects a result of the analysis of the second object data conducted by the second object data analysis unit onto the first object data.

Japanese Unexamined Patent Application Publication No. 2016-150549 discloses a solid body forming apparatus including a head unit that discharges a liquid including a color material component and a curing unit that forms dots by curing the liquid discharged from the head unit. A model indicating a shape and a color of a solid body to be formed is approximated using a group of voxels having a certain rectangular parallelepiped shape. A unit object including one or a plurality of dots is formed on the voxels. The solid body is formed using a plurality of unit objects. The plurality of unit objects included in the solid body include a first unit object including an amount of the color material component necessary to express the color indicated by the model and a second unit object that includes an amount of the color material component smaller than the amount of the color material component necessary to express the color indicated by the model. Two or more of six surfaces of the second unit object are surfaces of the solid body. A ratio of the volume of an inside portion of the model included in the second unit object to the volume of the second unit object is equal to or lower than a first reference value.

SUMMARY

Mesh data, which represents a three-dimensional object using a mesh including a plurality of polygons such as triangles, is known as three-dimensional object data for forming a smooth surface. In the case of mesh data, only a surface is approximated using a mesh including a plurality of polygons such as triangles, and it is difficult to represent an internal structure.

In addition, voxel data, which represents a three-dimensional object using a plurality of voxels, is known as three-dimensional object data for forming an internal structure of a three-dimensional object. In the case of voxel data, a surface and an internal structure of a three-dimensional object are represented using a group of voxels such as rectangular parallelepipeds, and it is difficult to represent a smooth surface.

Three-dimensional object data employing both mesh data and voxel data may be used, but in this case, the amount of data might become too large or a three-dimensional object represented by the mesh data and a three-dimensional object represented by the voxel data might be deviated from each other. In addition, data regarding an internal structure might be excessive or deficient. More specifically, for example, voxels might not exist inside a mesh representing a surface, or voxels might protrude from a mesh representing a surface.

Aspects of non-limiting embodiments of the present disclosure relate to a three-dimensional object data generation apparatus, a three-dimensional object forming apparatus, and a program for generating three-dimensional object data capable of obtaining three-dimensional object data that defines an internal structure of a three-dimensional object while securing smoothness of a surface of the three-dimensional object.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a three-dimensional object data generation apparatus including a setting unit that sets a basic voxel group defined using at least one voxel in accordance with a shape of a surface of a three-dimensional object on a basis of three-dimensional object data indicating the surface of the three-dimensional object using at least either a plurality of flat surfaces or a curved surface and a generation unit that generates three-dimensional object data in which voxels are set inside the surface on a basis of the basic voxel group.

BRIEF DESCRIPTION OF THE DRAWINGS

Exemplary embodiments of the present disclosure will be described in detail based on the following figures, wherein:

FIG. 1 is a diagram illustrating the configuration of a three-dimensional object forming system;

FIG. 2 is a diagram illustrating the configuration of a three-dimensional object data generation apparatus;

DETAILED DESCRIPTION

Figure 3:
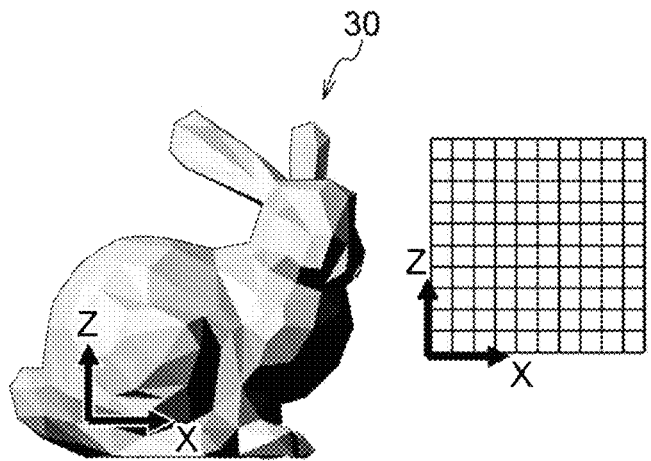
FIG. 3 is a diagram illustrating an example of a three-dimensional object represented by mesh data.

Exemplary embodiments of the present disclosure will be described in detail hereinafter with reference to the drawings.

First Exemplary Embodiment

FIG. 1 is a diagram illustrating the configuration of a three-dimensional object forming system 1 according to a first exemplary embodiment. As illustrated in FIG. 1, the three-dimensional object forming system 1 includes a three-dimensional object data generation apparatus 10 and a three-dimensional object forming apparatus 100.

Next, the configuration of the three-dimensional object data generation apparatus 10 according to the first exemplary embodiment will be described with reference to FIG. 2.

The three-dimensional object data generation apparatus 10 is a personal computer, for example, and includes a controller 12. The controller 12 includes a central processing unit (CPU) 12A, a read-only memory (ROM) 12B, a random-access memory (RAM) 12C, a nonvolatile memory 12D, and an input/output (I/O) interface 12E. The CPU 12A, the ROM 12B, the RAM 12C, the nonvolatile memory 12D, and the I/O interface 12E are connected to one another through a bus 12F.

An operation unit 14, a display unit 16, a communication unit 18, and a storage unit 20 are connected to the I/O interface 12E. The CPU 12A is an example of a setting unit and a generation unit.

The operation unit 14 includes, for example, a mouse and a keyboard.

The display unit 16 is, for example, a liquid crystal display.

The communication unit 18 is an interface for communicating data with external apparatuses.

The storage unit 20 is a nonvolatile storage device such as a hard disk and stores a program for generating three-dimensional object data, which will be described later, three-dimensional object data (mesh data), which represents a three-dimensional object using a mesh, and the like. The CPU 12A reads the program for generating three-dimensional object data stored in the storage unit 20 and executes the program.

The mesh data is three-dimensional object data representing, using a mesh, a surface of a three-dimensional object to be formed. A mesh includes at least either a flat surface or a curved surface. When a mesh includes a flat surface, for example, polygons such as triangles or quadrilaterals may be used.

FIG. 3 illustrates a three-dimensional object 30 representing a rabbit using a triangle mesh as an example of a three-dimensional object represented by mesh data. The mesh data defines only a surface of the three-dimensional object 30 and does not define an internal structure.

Figure 4:
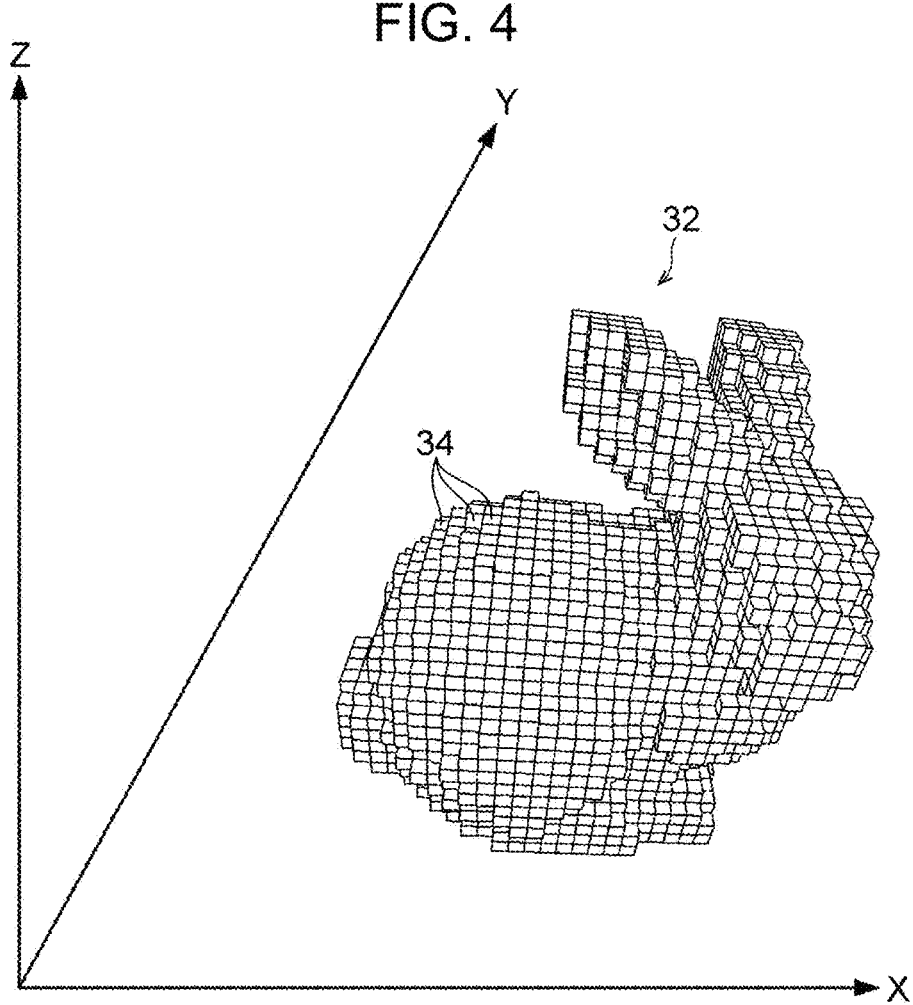
FIG. 4 is a diagram illustrating an example of a three-dimensional object represented by voxel data.

FIG. 4 illustrates a three-dimensional object 32 represented by three-dimensional object data (voxel data), which is a group of voxels. As illustrated in FIG. 4, the three-dimensional object 32 includes a plurality of voxels 34.

The voxels 34 are basic elements of the three-dimensional object 32. The voxels 34 may be rectangular parallelepipeds, for example, but may be spheres or cylinders, instead. A desired three-dimensional object is represented by stacking the voxels 34 on one another.

Voxel data defines the internal structure of a three-dimensional object. As an internal structure, at least a region whose material is different, an empty region in which no material exists, or an attribute is defined inside a three-dimensional object.

Figure 5A:
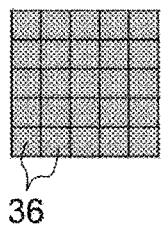
FIGS. 5A to 5D are diagrams illustrating attributes of voxels.
Figure 5B:
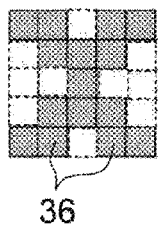

As illustrated in FIG. 5A, for example, the voxels 36 may be arranged without gaps. Alternatively, as illustrated in FIG. 5B, an object may be defined by setting presence or absence of each of the voxels 36.

Figure 5C:
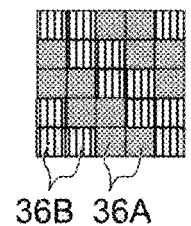

In addition, attributes of each voxel, namely color, strength, material, and texture, for example, may be set. As illustrated in FIG. 5C, for example, different attributes may be set for a voxel 36A and a voxel 36B. The "material" attribute includes at least information indicating a genre of the material, such as resin, metal, or rubber, information indicating a name of the material, such as acrylonitrile butadiene styrene (ABS) or polylactic acid (PLA), information indicating a product name or a product number of the material on the market, information indicating a name, an abbreviation, or a number of the material specified in International Organization for Standardization (ISO) standards, Japanese Industrial Standards (JIS), or the like, or information indicating a material property such as thermal conductivity, electrical conductivity, or magnetism.

The "texture" attribute may include not only the reflectivity, transmittance, luster, surface properties, and color of three-dimensional object data but also appearance and a feel.

The attributes include an attribute pattern set using at least a cycle, a numerical formula, or another piece of three-dimensional object data. The attribute pattern includes at least a continuous change to the color, the material, or the texture of three-dimensional object data based on repetition at a certain cycle, gradation, representation of inclinations or peaks represented by a numeral formula, or another piece of three-dimensional object data or filling of or a continuous change to a specified part of three-dimensional data with a specified shape.

Figure 5D:
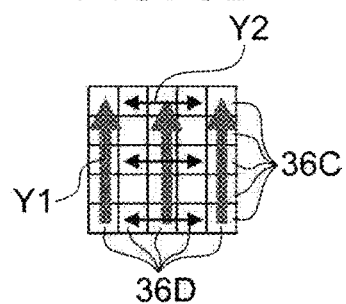

As illustrated in FIG. 5D, information indicating at least a degree of relation to adjacent voxels or a direction may be set for each voxel 36. In FIG. 36D, voxels 36C arranged in a direction indicated by an arrow Y1 are related to one another more closely than voxels 36D arranged in a direction indicated by an arrow Y2.

As a method for forming a three-dimensional object, for example, fused deposition modeling (FDM), in which a thermoplastic resin is plasticized and stacked to form a three-dimensional object, stereolithography, or a method employing a powder bed is used, but another method may be used, instead.

Next, a three-dimensional object forming apparatus that forms a three-dimensional object using three-dimensional object data generated by the three-dimensional object data generation apparatus 10 will be described.

Figure 6:
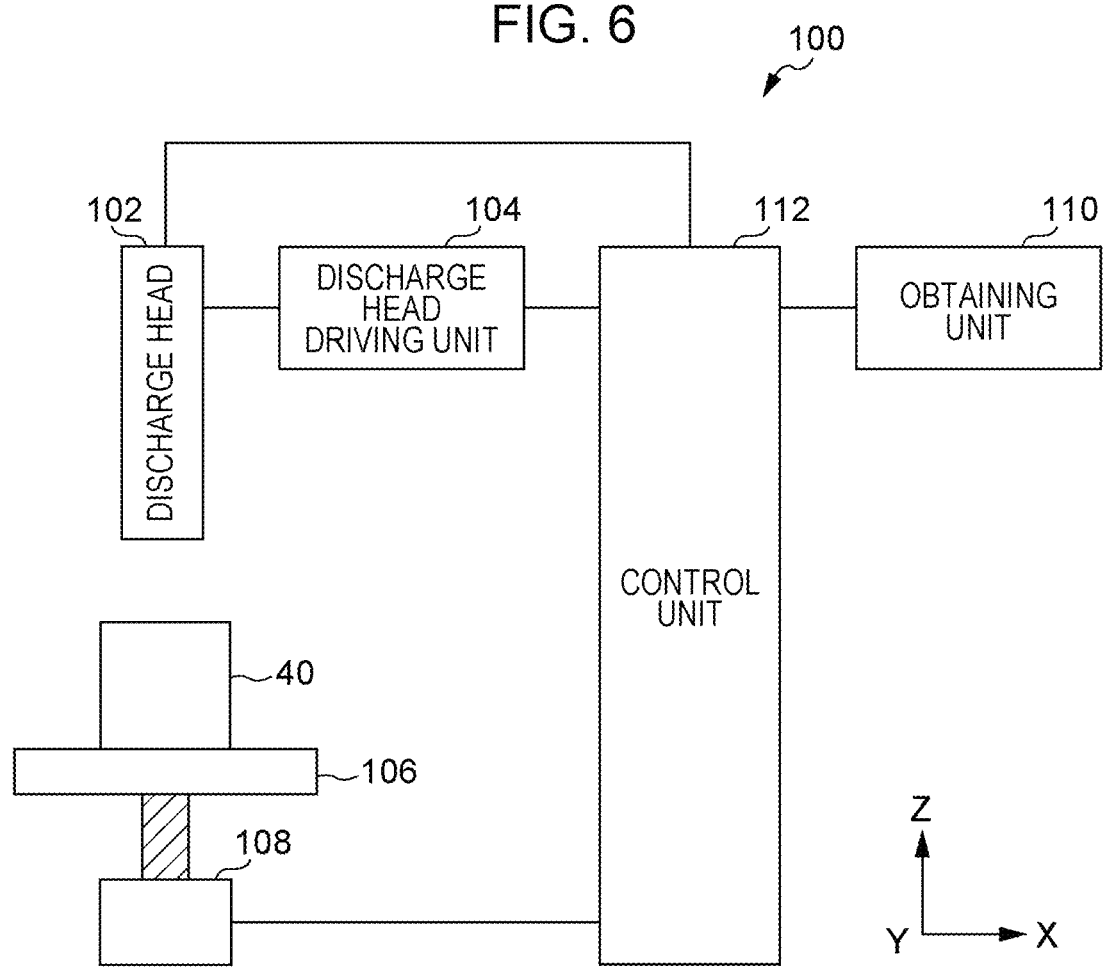
FIG. 6 is a diagram illustrating the configuration of a three-dimensional object forming apparatus.

FIG. 6 illustrates the configuration of the three-dimensional object forming apparatus 100 according to the present exemplary embodiment. As illustrated in FIG. 6, the three-dimensional object forming apparatus 100 includes a discharge head 102, a discharge head driving unit 104, a stand 106, a stand driving unit 108, an obtaining unit 110, and a control unit 112. The discharge head 102, the discharge head driving unit 104, the stand 106, and the stand driving unit 108 are an example of a forming unit.

The discharge head 102 includes an object material discharge head that discharges an object material for forming a three-dimensional object 40 and a support material discharge head that discharges a support material. The support material is used to support overhangs (also referred to as "projections") of the three-dimensional object 40 and removed after the three-dimensional object 40 is formed.

The discharge head 102 is driven by the discharge head driving unit 104 and moves on an X-Y plane in two dimensions. The object material discharge head may include a plurality of discharge heads corresponding to object materials of a plurality of attributes.

The stand 106 is driven by the stand driving unit 108 and moves along a Z axis.

The obtaining unit 110 obtains three-dimensional object data and support material data generated by the three-dimensional object data generation apparatus 10.

The control unit 112 drives the discharge head driving unit 104 to move the discharge head 102 in two dimensions and controls the discharge of the object material and the support material performed by the discharge head 102 such that the object material is discharged in accordance with the three-dimensional object data obtained by the obtaining unit 110 and the support material is discharged in accordance with the support material data.

Each time a layer has been formed, the control unit 112 drives the stand driving unit 108 to lower the stand 106 by a predetermined layer interval.

Figure 7:
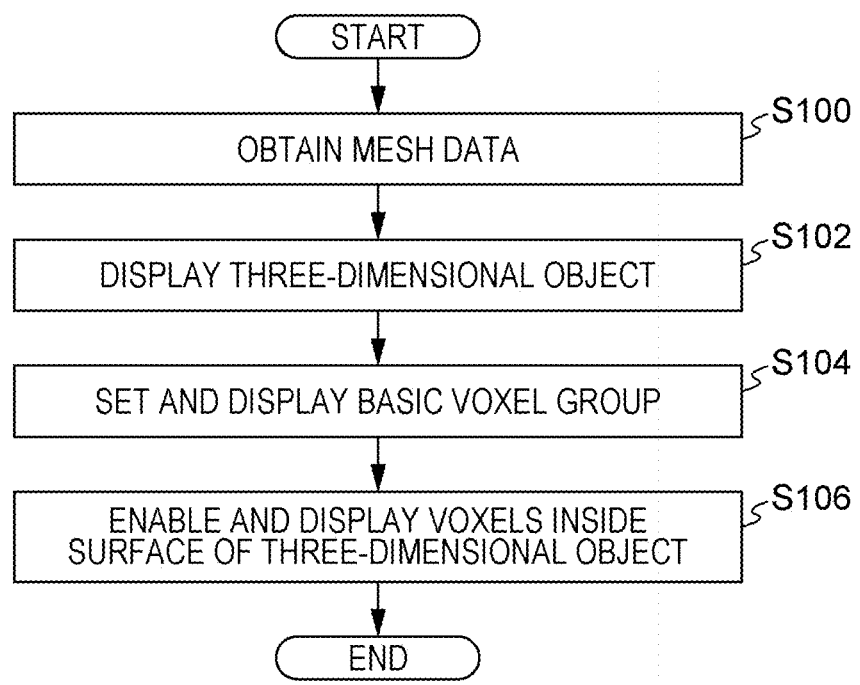
FIG. 7 is a flowchart illustrating a process achieved by a program for generating three-dimensional object data according to a first exemplary embodiment.

Next, the operation of the three-dimensional object data generation apparatus 10 according to the present exemplary embodiment will be described with reference to FIG. 7. A generation process illustrated in FIG. 7 is performed by causing the CPU 12A to execute a program for generating three-dimensional object data. The generation process illustrated in FIG. 7 is performed, for example, when a user has requested execution of the program. In the present exemplary embodiment, description of a process for generating support material data is omitted.

In step S100, mesh data is read from the storage unit 20. Alternatively, mesh data may be obtained from an external apparatus using the communication unit 18.

In step S102, three-dimensional object display data is generated from the mesh data obtained in step S100 and displayed on the display unit 16.

Figure 8:
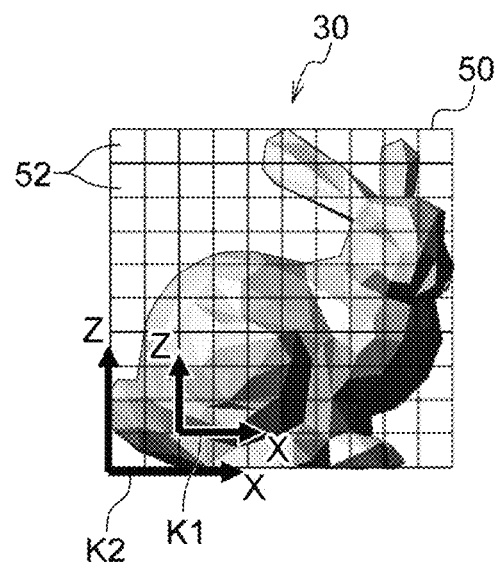
FIG. 8 is a diagram illustrating a basic voxel group including a three-dimensional object.

In step S104, a basic voxel group defined using one or more voxels is set in accordance with a shape of a surface of a three-dimensional object and displayed on the display unit 16. More specifically, a three-dimensional basic voxel unit group including a surface of a three-dimensional object is defined using a plurality of voxels. As illustrated in FIG. 8, for example, a rectangular parallelepiped basic voxel group 50 including the three-dimensional object 30 is defined using a plurality of voxels 52. That is, although FIG. 8 illustrates only voxels 52 that define the basic voxel group 50 on an X-Z plane, the basic voxel group 50 is also defined using the plurality of voxels 52 such that the plurality of voxels 52 include the three-dimensional object 30 on the X-Y plane and a Y-Z plane.

Figure 9:
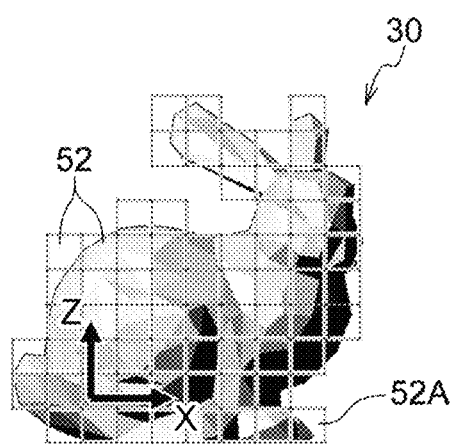
FIG. 9 is a diagram illustrating a case where voxels inside the three-dimensional object are enabled.

In step S106, voxel data is generated by enabling, among the voxels 52 of the basic voxel group 50 set in step S104, voxels 52 located inside the surface of the three-dimensional object 30. As illustrated in FIG. 9, for example, among the voxels 52 of the basic voxel group 50, only voxels 52 that include at least a part of the three-dimensional object 30 are enabled.

As a method for enabling only internal voxels, for example, voxels that include the surface of the three-dimensional object 30, that is, voxels that intersect with the surface of the three-dimensional object 30, such as a voxel 52A illustrated in FIG. 9, may be enabled, and then voxels surrounded by these voxels may be enabled. Voxels that intersect with the surface of the three-dimensional object 30 may be identified on the basis of a positional relationship between vertices of the voxels and vertices of polygons on the surface.

Alternatively, whether to enable each voxel 52 may be determined on the basis of a ratio of the volume of the voxel 52 to the volume of the three-dimensional object 30 included in the voxel 52. If the ratio is equal to or higher than a predetermined threshold, for example, the voxel 52 may be enabled. If the ratio is lower than the threshold, the voxel 52 may be disabled. Although the threshold is 50% in the present exemplary embodiment, the threshold is not limited to this.

Alternatively, a voxel located opposite a normal to a polygon that is a part of the surface of the three-dimensional object 30 and that is closest to a target voxel may be enabled in accordance with a distance between the target voxel and the polygon.

As a result, three-dimensional object data in which the surface of the three-dimensional object 30 is represented by mesh data and the inside of the surface of the three-dimensional object 30 is represented by voxel data is generated. In step S106, only enabled voxels 52 are displayed on the display unit 16.

The voxel 52A, which intersects with the surface of the three-dimensional object 30, may be divided into smaller voxels, and voxels that include a part of the inside of the three-dimensional object 30 may be enabled.

For the voxel 52A that intersects with the surface of the three-dimensional object 30, information indicating an interface with the surface of the three-dimensional object 30, that is, for example, information indicating points of intersection between the voxel 52A and the surface of the three-dimensional object 30, may be set.

For the voxel 52A that intersects with the surface of the three-dimensional object 30, a pattern indicating an interface between a region in which the three-dimensional object 30 exists and a region in which the three-dimensional object 30 does not exist may be provided using marching cubes.

If a coordinate system K1 of the mesh data and a coordinate system K2 of the voxel data illustrated in FIG. 8 are different from each other, enabled voxels 52 may be normalized to the coordinate system K1 of the mesh data.

The obtaining unit 110 of the three-dimensional object forming apparatus 100 obtains three-dimensional object data and support material data generated by the three-dimensional object data generation apparatus 10. The control unit 112 drives the discharge head driving unit 104 to move the discharge head 102 in two dimensions and controls the discharge of an object material and a support material such that the object material and the support material are discharged in accordance with the three-dimensional object data and the support material data, respectively, obtained by the obtaining unit 110.

When controlling the discharge of the object material, the control unit 112 performs the control such that the object material is discharged inside a contour of a three-dimensional object represented by the three-dimensional object data generated by the three-dimensional object data generation apparatus 10, the contour being obtained by slicing the three-dimensional object at layer intervals used by the three-dimensional object forming apparatus 100 to form the three-dimensional object.

Figure 10:
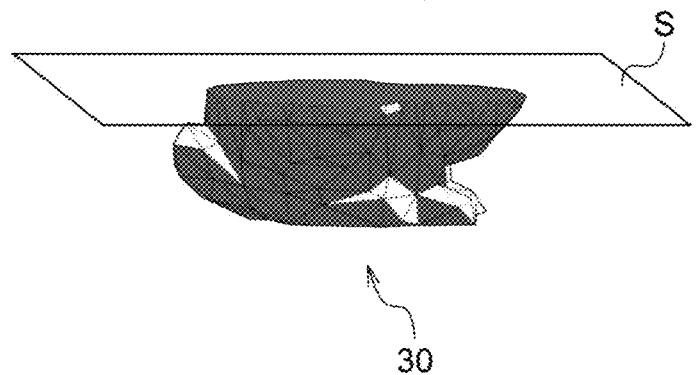
FIG. 10 is a diagram illustrating the three-dimensional object sliced along a slicing plane.
Figure 11:
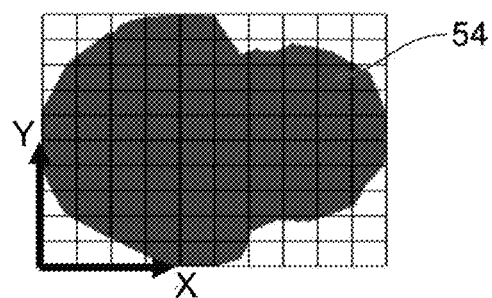
FIG. 11 is a diagram illustrating a planar contour of the three-dimensional object obtained by slicing the three-dimensional object along the slicing plane.

A case where, as illustrated in FIG. 10, for example, a contour of the three-dimensional object 30 on the X-Y plane obtained by slicing the three-dimensional object 30 along a slicing plane S is a contour 54 illustrated in FIG. 11 will be described. In this case, an object material is discharged when the discharge head 102 has moved to an inside of the contour 54 on the basis of mesh data. When the three-dimensional object 30 is formed on the slicing plane S, only voxels in the basic voxel group 50 corresponding to the height of the slicing plane S may be used. At this time, at least a color, an object material, a hollow structure, or a parameter (head speed, a material discharge rate, head temperature, etc.) for controlling forming corresponding to attributes set for voxels at a position at which the object material is to be discharged is selected on the basis of voxel data.

Figure 12:
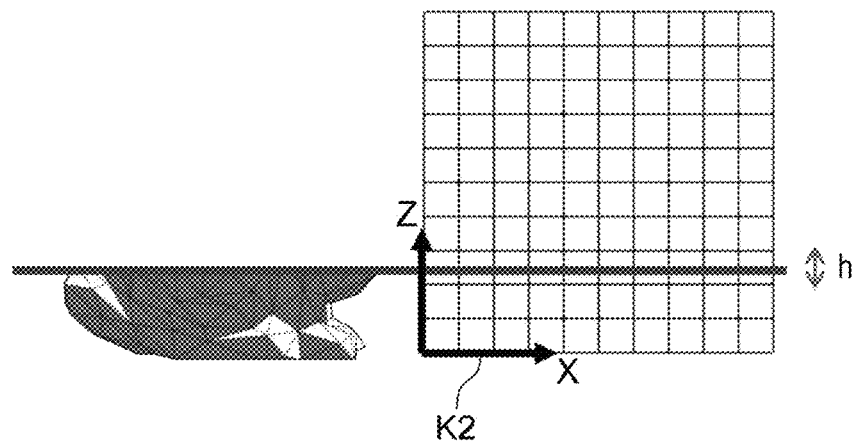
FIG. 12 is a diagram illustrating a relationship between layer intervals of the three-dimensional object forming apparatus and the size of each voxel.

If the layer intervals of the three-dimensional object forming apparatus 100 are equal to or smaller than a height h (the length along the Z axis) of each voxel illustrated in FIG. 12, the discharge of the object material is controlled using voxel data corresponding to the height h of each voxel.

If the layer intervals are larger than the height h of each voxel, on the other hand, the discharge of the object material may be controlled using voxel data corresponding to a height h of a plurality of voxels. In this case, for example, attributes of a plurality of voxels arranged in a height direction are combined together. For example, the attributes of the plurality of voxels arranged in the height direction may be averaged, attributes of a top one of the plurality of voxels arranged in the height direction may be employed, or attributes of a voxel randomly selected from the plurality of voxels arranged in the height direction may be employed.

Although the three-dimensional object data generation apparatus 10 and the three-dimensional object forming apparatus 100 that forms a three-dimensional object on the basis of three-dimensional object data are separate components in the present exemplary embodiment, the three-dimensional object forming apparatus 100 may have the functions of the three-dimensional object data generation apparatus 10, instead.

That is, the obtaining unit 110 of the three-dimensional object forming apparatus 100 may obtain mesh data, and the control unit 112 may perform the generation process illustrated in FIG. 7 to generate three-dimensional object data.

Second Exemplary Embodiment

Next, a second exemplary embodiment will be described. The same components as those according to the first exemplary embodiment will be given the same reference numerals, and detailed description thereof is omitted.

A three-dimensional object data generation apparatus 10 and a three-dimensional object forming apparatus 100 according to the second exemplary embodiment are the same as those according to the first exemplary embodiment, and description thereof is omitted.

Figure 13:
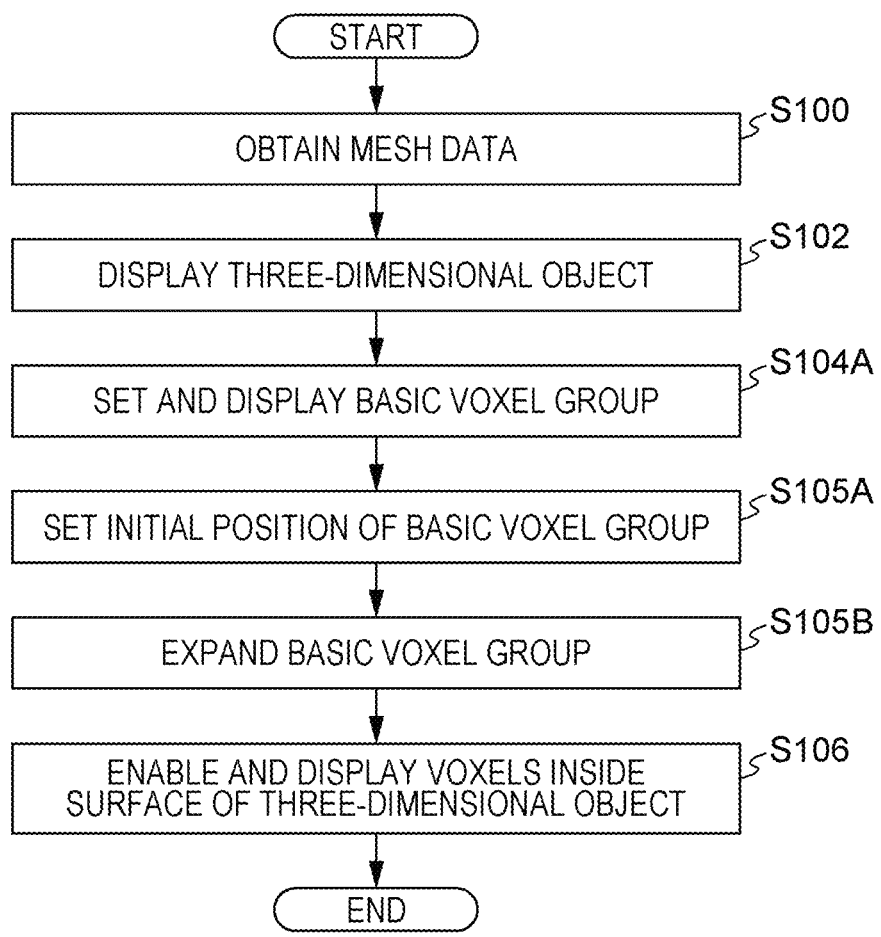
FIG. 13 is a flowchart illustrating a process achieved by a program for generating three-dimensional object data according to a second exemplary embodiment.

Next, the operation of the three-dimensional object data generation apparatus 10 according to the present exemplary embodiment will be described with reference to FIG. 13. A generation process illustrated in FIG. 13 is performed by causing the CPU 12A to execute a program for generating three-dimensional object data. The generation process illustrated in FIG. 13 is performed, for example, when the user has requested execution of the program. In the present exemplary embodiment, description of a process for generating support material data is omitted.

Steps S100 and S102 illustrated in FIG. 13 are the same as those illustrated in FIG. 7, and description thereof is omitted.

Figure 14:
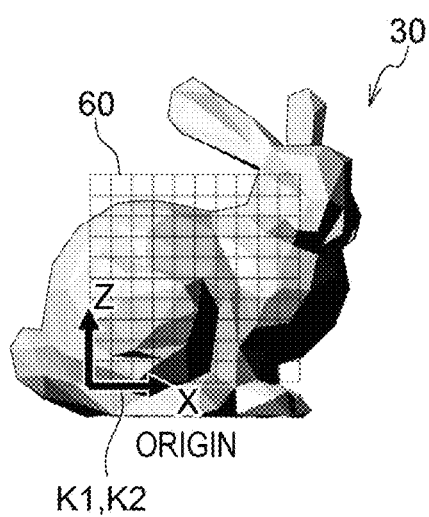
FIG. 14 is a diagram illustrating an example of a method for setting an initial position of a basic voxel group.

In step S104A, a basic voxel group defined using one or more voxels is set in accordance with a shape of a surface of a three-dimensional object and displayed on the display unit 16. More specifically, a basic voxel group smaller than a three-dimensional object, that is, a basic voxel group that does not include a surface of a three-dimensional object, is defined using a plurality of voxels. As illustrated in FIG. 14, for example, a rectangular parallelepiped that does not include the surface of the three-dimensional object 30 is defined using a plurality of voxels and set as a basic voxel group 60.

In step S105A, an initial position of the basic voxel group 60 set in step S104A is set. More specifically, the initial position is set by rotating, enlarging, reducing, and/or moving the basic voxel group 60 through a user operation.

Alternatively, the user may select one of a plurality of methods for setting an initial position.

As illustrated in FIG. 14, for example, the user may select a first method, in which the initial position of the basic voxel group 60 is set such that an origin of a coordinate system K1 of mesh data and an origin of a coordinate system K2 of voxel data match.

Figure 15:
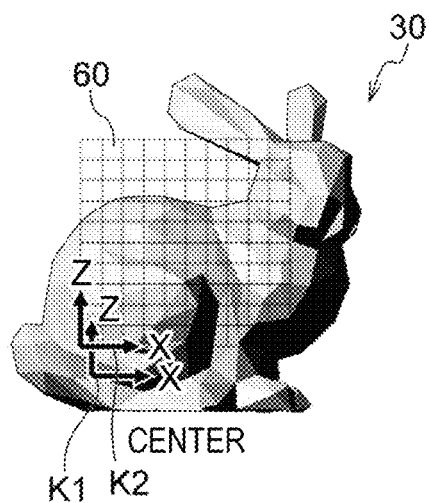
FIG. 15 is a diagram illustrating another example of the method for setting an initial position of a basic voxel group.

Alternatively, as illustrated in FIG. 15, for example, the user may select a second method, in which the initial position of the basic voxel group 60 is set such that the center of the three-dimensional object 30 and the center of the basic voxel group 60 match.

Figure 16:
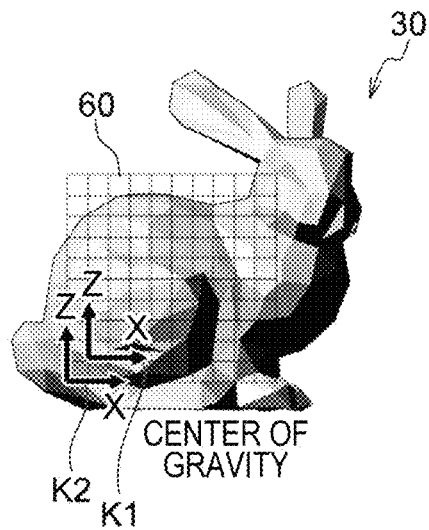
FIG. 16 is a diagram illustrating another example of the method for setting an initial position of a basic voxel group.

Alternatively, as illustrated in FIG. 16, for example, the user may select a third method, in which the initial position of the basic voxel group 60 is set such that the center of gravity of the three-dimensional object 30 and the center of gravity of the basic voxel group 60 match.

Figure 17:
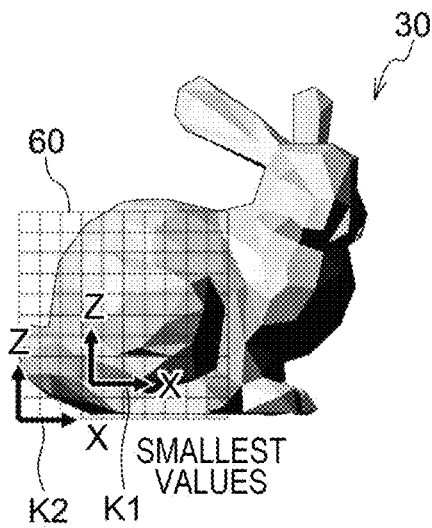
FIG. 17 is a diagram illustrating another example of the method for setting an initial position of a basic voxel group.

Alternatively, as illustrated in FIG. 17, for example, the user may select a fourth method, in which the initial position of the basic voxel group 60 is set such that smallest values of X, Y, and Z coordinates of the three-dimensional object 30 in the coordinate system of the three-dimensional object 30, that is, the coordinate system K1 of the mesh data, and smallest values of X, Y, and Z coordinates of the coordinate system of the basic voxel group 60, that is, the coordinate system K2 of the voxel data, match.

Figure 18:
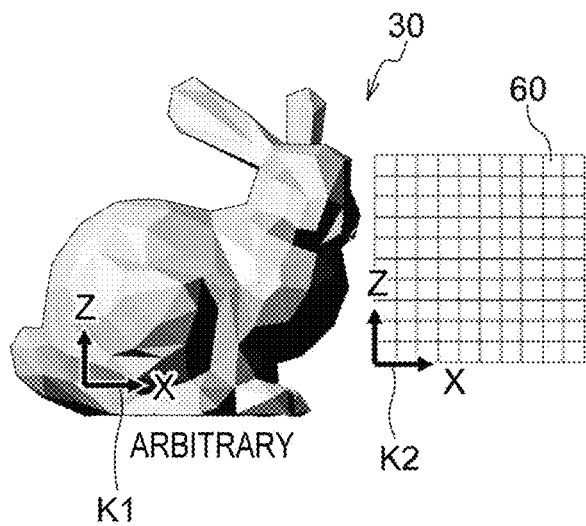
FIG. 18 is a diagram illustrating another example of the method for setting an initial position of a basic voxel group.

Alternatively, as illustrated in FIG. 18, for example, the user may select a fifth method, in which the initial position of the basic voxel group 60 is arbitrarily set.

Figure 19:
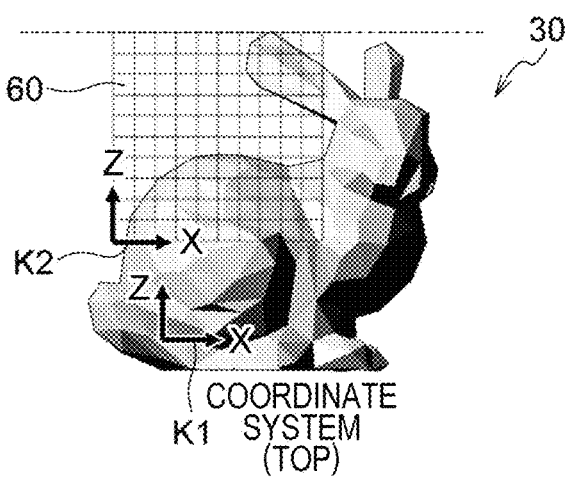
FIG. 19 is a diagram illustrating another example of the method for setting an initial position of a basic voxel group.

Alternatively, as illustrated in FIG. 19, for example, the user may select a sixth method, in which the initial position of the basic voxel group 60 is set such that a largest value of the Z coordinate of the three-dimensional object 30 in the coordinate system K1 of the mesh data and a largest value of the Z coordinate of the basic voxel group 60 in the coordinate system K2 of the voxel data match.

Figure 20:
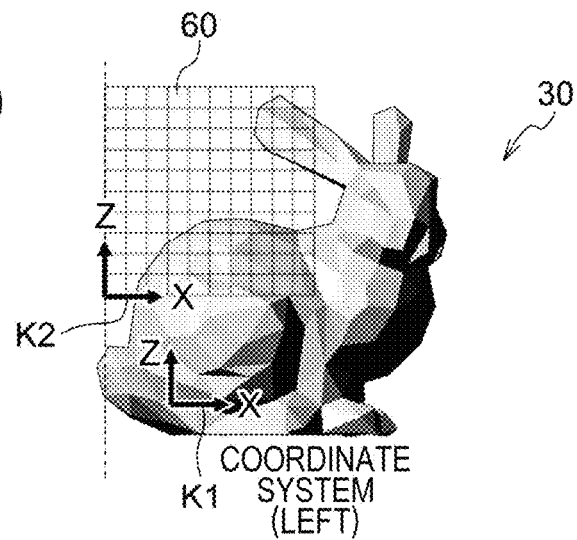
FIG. 20 is a diagram illustrating another example of the method for setting an initial position of a basic voxel group.

Alternatively, as illustrated in FIG. 20, for example, the user may select a seventh method, in which the initial position of the basic voxel group 60 is set such that a smallest value of the X coordinate of the three-dimensional object 30 in the coordinate system K1 of the mesh data and a smallest value of the X coordinate of the basic voxel group 60 in the coordinate system K2 of the voxel data match.

Figure 21:
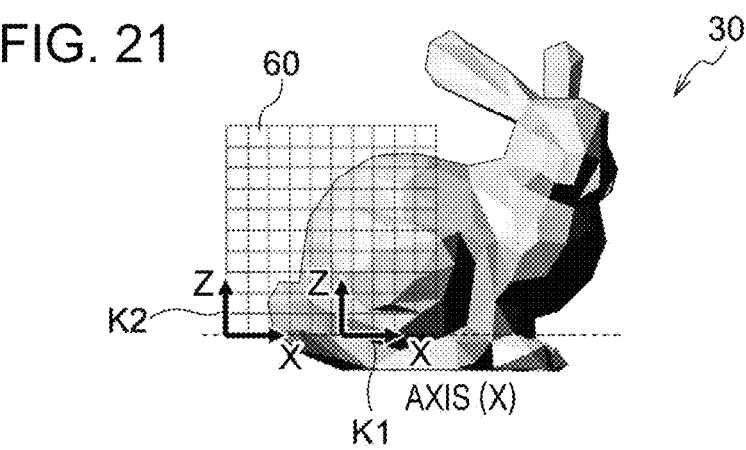
FIG. 21 is a diagram illustrating another example of the method for setting an initial position of a basic voxel group.

Alternatively, as illustrated in FIG. 21, for example, the user may select an eighth method, in which the initial position of the basic voxel group 60 is set such that an X axis in the coordinate system K1 of the mesh data and an X axis in the coordinate system K2 of the voxel data match.

Figure 22:
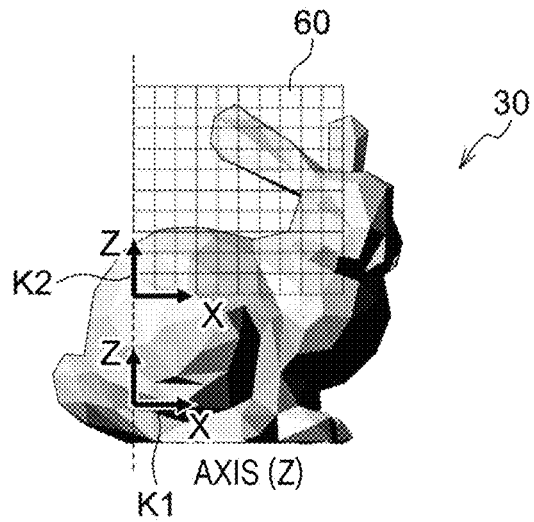
FIG. 22 is a diagram illustrating another example of the method for setting an initial position of a basic voxel group.

Alternatively, as illustrated in FIG. 22, for example, the user may select a ninth method, in which the initial position of the basic voxel group 60 is set such that a Z axis in the coordinate system K1 of the mesh data and a Z axis in the coordinate system K2 of the voxel data match.

In step S105B, the basic voxel group 60 is expanded from the initial position thereof selected in step S105A in such a way as to encompass the entirety of the inside of the three-dimensional object 30. The basic voxel group 60 is expanded through extension or repetition.

In extension, outermost voxels of the basic voxel group 60, that is, voxels on a surface of the basic voxel group 60, are extended outward until the three-dimensional object 30 is filled with voxels.

In repetition, the basic voxel group 60 is repetitively provided in X, Y, and Z directions until the three-dimensional object 30 is filled with voxels.

The user may select extension or repetition before expanding the basic voxel group 60.

Figure 23:
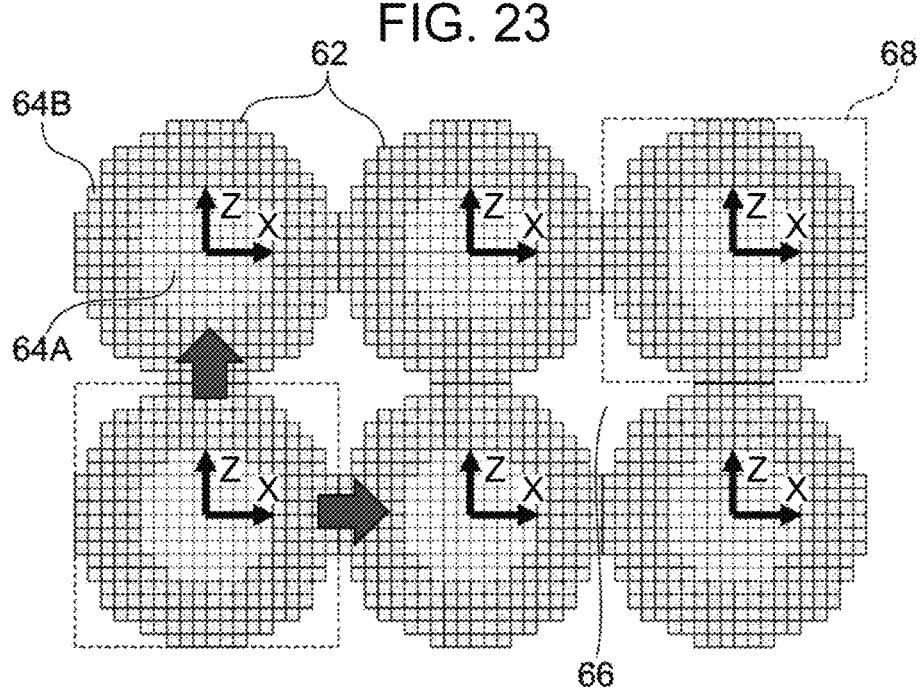
FIG. 23 is a diagram illustrating spherical basic voxel groups.

A basic voxel group need not be a rectangular parallelepiped. As illustrated in FIG. 23, for example, a basic voxel group may be a spherical basic voxel group 62. The spherical basic voxel group 62 is obtained by arranging a plurality of voxels 64B around a spherical voxel group including a plurality of voxels 64A, whose attributes are different from those of the voxels 64B.

When the three-dimensional object 30 is filled with voxels by repetitively providing the spherical basic voxel group 62, the spherical basic voxel group 62 may be repetitively provided in a plus or minus direction of the X, Y, and Z axes as illustrated in FIG. 23. The spherical basic voxel group 62 need not necessarily be repetitively provided along the X, Y, and Z axes. For example, the spherical basic voxel group 62 may be repetitively provided in a direction that intersects with the X, Y, and Z axes, that is, in a diagonal direction, instead. Alternatively, the spherical basic voxel group 62 may be repetitively provided in a curved manner. Alternatively, the spherical basic voxel group 62 may be repetitively provided outward radially on the basis of polar coordinates. Alternatively, the spherical basic voxel group 62 may be repetitively arranged spirally.

Figure 24:
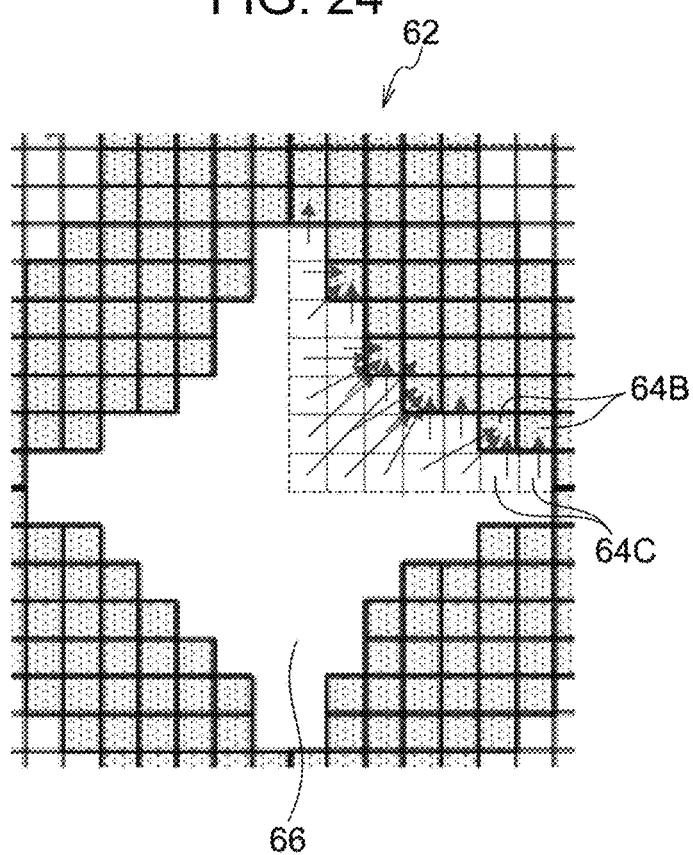
FIG. 24 is a diagram illustrating setting of attributes of voxels in gaps between the spherical basic voxel groups.

As illustrated in FIG. 23, when the spherical basic voxel groups 62 are employed, gaps 66 are caused between the adjacent spherical basic voxel groups 62. In this case, for example, a bounding box 68 is provided for each spherical basic voxel group 62. As illustrated in FIG. 24, attribute values of outermost voxels 64B of the spherical basic voxel group 62 corresponding to the bounding box 68 may then be copied to voxels 64C in the gap 66.

Step S106 is the same as that illustrated in FIG. 7, and description thereof is omitted.

The control performed by the control unit 112 of the three-dimensional object forming apparatus 100 to discharge an object material is the same as that according to the first exemplary embodiment, and description thereof is omitted.

Third Exemplary Embodiment

Next, a third exemplary embodiment will be described. In the third exemplary embodiment, a case where a plurality of different basic voxel groups are set will be described. The same components as those described in the above-described exemplary embodiments will be given the same reference numerals, and detailed description thereof is omitted.

A three-dimensional object data generation apparatus 10 and a three-dimensional object forming apparatus 100 according to the third exemplary embodiment are the same as those according to the first exemplary embodiment, and description thereof is omitted.

Figure 25:
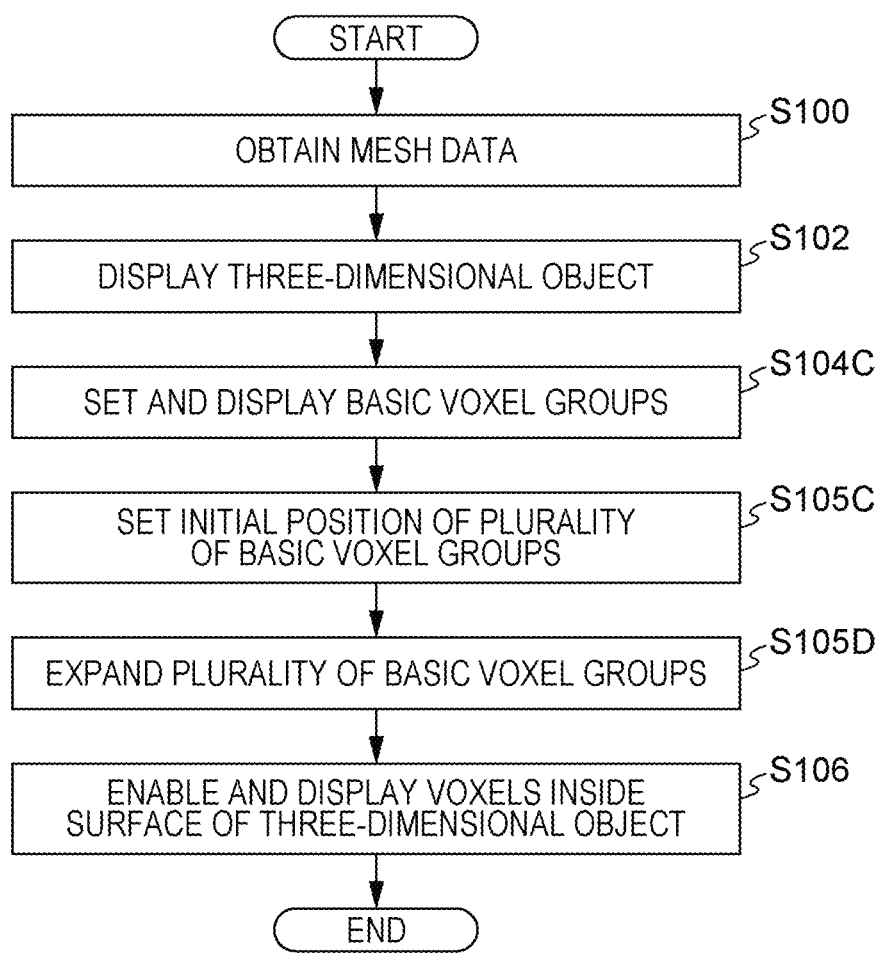
FIG. 25 is a flowchart illustrating a process achieved by a program for generating three-dimensional object data according to a third exemplary embodiment.

Next, the operation of the three-dimensional object data generation apparatus 10 according to the present exemplary embodiment will be described. By causing the CPU 12A to execute a program for generating three-dimensional object data, a generation process illustrated in FIG. 25 is performed. The generation process illustrated in FIG. 25 is performed, for example, when the user has requested execution of the program. In the present exemplary embodiment, description of a process for generating support material data is omitted.

Steps S100 and S102 illustrated in FIG. 25 are the same as those illustrated in FIG. 7, and description thereof is omitted.

Figure 26:
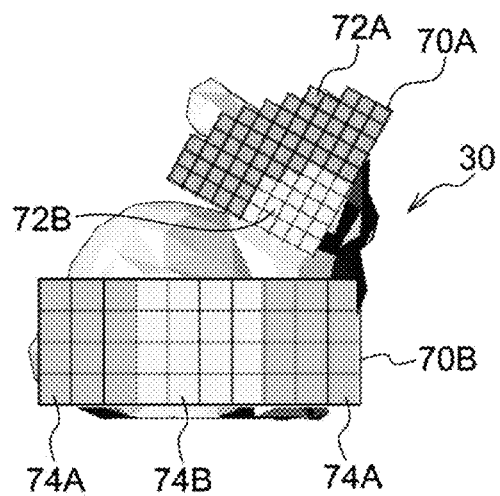
FIG. 26 is a diagram illustrating a case where a plurality of basic voxel groups are set.

In step S104C, a plurality of basic voxel groups are set and displayed on the display unit 16. A method for setting each basic voxel group is the same as in step S104A illustrated in FIG. 13, and detailed description thereof is omitted. As illustrated in FIG. 26, for example, a basic voxel group 70A is set for a head of a rabbit, which is the three-dimensional object 30, and a basic voxel group 70B is set for a body of the rabbit. The basic voxel group 70A includes a plurality of voxels 72A and 72B having different attributes. The basic voxel group 70B includes a plurality of voxels 74A and 74B having different attributes.

The basic voxel groups 70A and 70B may be set by the user or may be automatically set in accordance with shapes of a plurality of regions obtained by dividing the three-dimensional object 30.

In step S105C, initial positions of the basic voxel groups 70A and 70B set in step S104C are set. A method for setting the initial position of each basic voxel group is the same as in step S105A illustrated in FIG. 13, and detailed description thereof is omitted.

In step S105D, the basic voxel groups 70A and 70B are expanded from the initial positions thereof selected in step S105A in such a way as to encompass the entirety of the inside of the three-dimensional object 30. The basic voxel groups 70A and 70B are expanded through extension or repetition as in the second exemplary embodiment.

Figure 27:
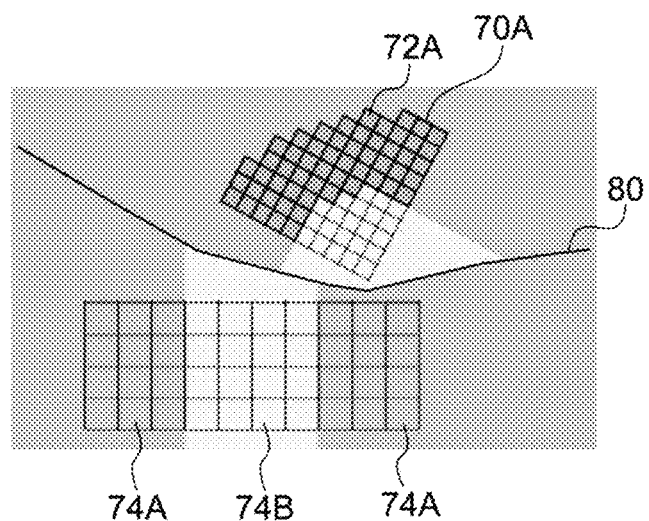
FIG. 27 is a diagram illustrating a case where the plurality of basic voxel groups are expanded through extension.

FIG. 27 illustrates an example in which the basic voxel groups 70A and 70B are expanded through extension. In this case, a line connecting midpoints between corresponding outermost voxels of the basic voxel groups 70A and 70B to one another is a boundary line 80. As illustrated in FIG. 27, if resolution levels of the basic voxel groups 70A and 70B are different from each other, that is, if sizes of voxels are different from each other, the basic voxel groups 70A and 70B may be expanded after the sizes of the voxels are normalized.

By expanding the basic voxel groups 70A and 70B through extension, a group of voxels encompassing the surface of the three-dimensional object 30 can be obtained.

Figure 28:
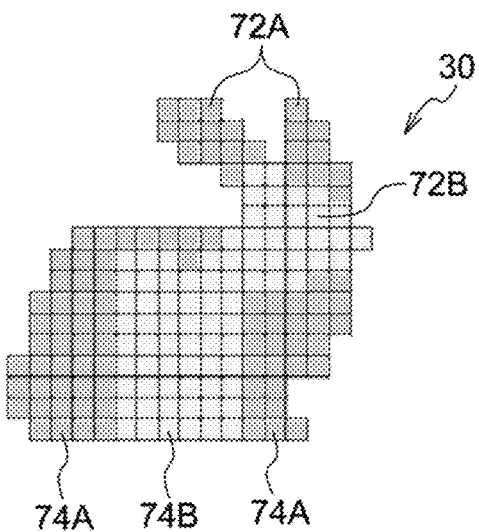
FIG. 28 is a diagram illustrating an example in which the plurality of basic voxel groups are expanded through extension and only voxels inside the three-dimensional object are enabled.

Step S106 is the same as that illustrated in FIG. 7, and description thereof is omitted. As a result, as illustrated in FIG. 28, only voxels inside the surface of the three-dimensional object 30 are enabled.

Although the present disclosure has been described on the basis of the exemplary embodiments, the present disclosure is not limited to the above exemplary embodiments. The exemplary embodiments may be modified or improved without deviating from the spirit of the present disclosure, and the technical scope of the present disclosure includes such modifications and improvements.

Figure 29:
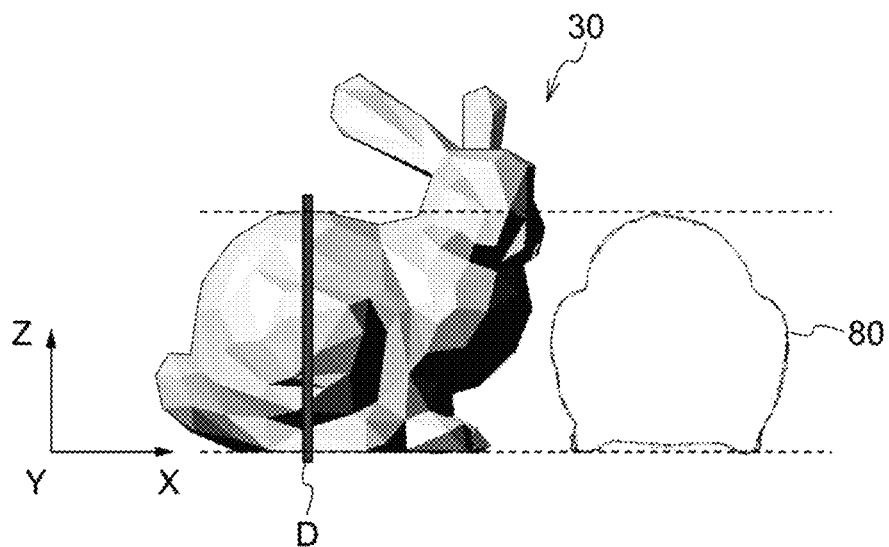
FIG. 29 is a diagram illustrating a case where predetermined attributes are set for voxels in a region having a predetermined thickness from a surface of the three-dimensional object.
Figure 30:
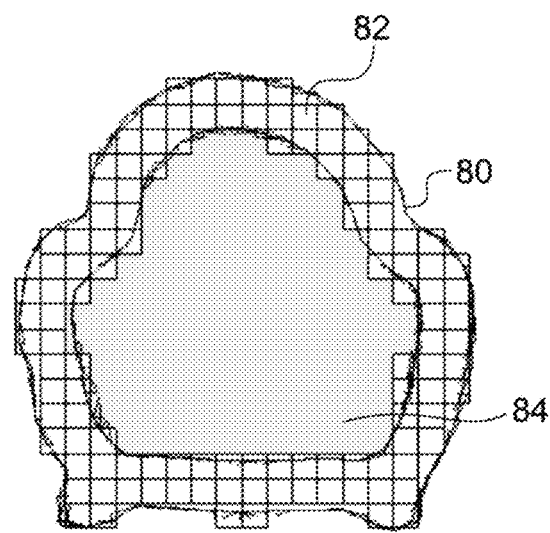
FIG. 30 is a diagram illustrating the case where the predetermined attributes are set for the voxels in the region having the predetermined thickness from the surface of the three-dimensional object.

For example, after voxels inside the surface of the three-dimensional object 30 are enabled using one of the methods described in the first to third exemplary embodiments, predetermined attributes may be set for voxels in a first region having a predetermined thickness from the surface. That is, among the voxels enabled using one of the methods described in the first to third exemplary embodiments, voxels in a second region, which is located deeper than the first region, are enabled. Now, a contour 80 of a cross-section D taken along the Y-Z plane of the three-dimensional object 30 is taken as an example as illustrated in FIG. 29. In this case, as illustrated in FIG. 30, predetermined attributes are set for voxels in a first region 82 having a predetermined thickness from the surface of the three-dimensional object 30, and attributes of voxels enabled using one of the methods described in the first to third exemplary embodiments are used in a second region 84, which is located deeper than the first region 82.

One or a plurality of attributes may be set for each voxel in the first region 82.

In addition, the processes for generating three-dimensional object data illustrated in FIGS. 7, 13, and 25 may be performed using hardware such as an application-specific integrated circuit (ASIC). In this case, the processes can be performed at higher speed than when the processes are performed using software.

Although the programs for generating three-dimensional object data are installed on the storage unit 20 in the above exemplary embodiments, the programs need not be installed on the storage unit 20. The programs for generating three-dimensional object data according to the above exemplary embodiments may be provided using a non-transitory computer readable medium, instead. The programs for generating three-dimensional object data in the present disclosure may be provided, for example, using an optical disc such as a compact disc read-only memory (CD-ROM) or a digital versatile disc read-only memory (DVD-ROM) or a semiconductor memory such as a universal serial bus (USB) memory or a memory card. Alternatively, the programs for generating three-dimensional object data according to the above exemplary embodiments may be obtained from an external apparatus through a communication line connected to the communication unit 18.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A three-dimensional object data generation apparatus comprising:
    a processor, being configured to,
        set a basic voxel group defined using at least one voxel in accordance with a shape of a surface of a three-dimensional object on a basis of three-dimensional object data indicating the surface of the three-dimensional object using at least either a plurality of flat surfaces or a curved surface; and
        generate three-dimensional object data in which voxels are set inside the surface on a basis of the basic voxel group,
    wherein the processor sets the basic voxel group smaller than the three-dimensional object, and generates the three-dimensional object data in which voxels are set entirely within the surface by expanding the basic voxel group from an initial position located inside the surface of the three-dimensional object to another position which does not intersect with the surface of the three-dimensional object and setting mesh data representing the surface of the three-dimensional object, wherein the processor expands the basic voxel group by repetitively providing the basic voxel group until the three-dimensional object is filled with voxels, and if gaps are caused between adjacent basic voxel groups after the basic voxel group is repetitively provided, the processor copies an attribute value of outermost voxels of the basic voxel group to voxels in the gaps.

2. The three-dimensional object data generation apparatus according to claim 1, wherein the processor generates the three-dimensional object data in which voxels are set inside the surface by enabling voxels inside the surface.

3. The three-dimensional object data generation apparatus according to claim 2, wherein the processor enables only voxels in a second region, which is located deeper than a first region having a predetermined thickness from the surface of the three-dimensional object, and sets voxels having a predetermined attribute in the first region.

4. The three-dimensional object data generation apparatus according to claim 2, wherein the processor enables the voxels inside the surface according to a ratio of a volume of the voxels to a volume of the three-dimension object included in the voxels.

5. The three-dimensional object data generation apparatus according to claim 1, wherein the processor sets a plurality of different basic voxel groups in accordance with the shape of the surface, and generates the three-dimensional object data in which voxels are set inside the surface on a basis of the plurality of different basic voxel groups.

6. The three-dimensional object data generation apparatus according to claim 1, wherein the processor expands the basic voxel group by extending outermost voxels of the basic voxel group outward until the three-dimensional object is filled with voxels.

7. The three-dimensional object data generation apparatus according to claim 1, wherein the processor divides voxels that intersect with the surface of the three-dimensional object into smaller voxels.

8. A three-dimensional object forming apparatus comprising:

a forming unit, comprising a discharge head that forms a three-dimensional object on a basis of three-dimensional object data generated by the three-dimensional object data generation apparatus according to claim 1.

9. A non-transitory computer readable medium storing a program for generating three-dimensional object data that causes a computer to function as the components of the three-dimensional object data generation apparatus according to claim 1.

10. The three-dimensional object data generation apparatus according to claim 1, wherein the processor sets the initial position of the basic voxel group from a plurality of methods for setting the initial position.

11. The three-dimensional object data generation apparatus according to claim 1, wherein the processor sets a plurality of different basic voxel groups based on a resolution level of each of the plurality of different basic voxel groups, wherein the plurality of different basic voxel groups represents a plurality of portions of the three-dimensional object.

12. The three-dimensional object data generation apparatus according to claim 11, wherein the plurality of portions of the three-dimensional object comprises a first portion and a second portion, wherein, when a resolution level of a basic voxel group corresponding to the first portion is different from a resolution level of a basic voxel group corresponding to the second portion, the basic voxel group corresponding to the first portion is expanded differently from the basic voxel group corresponding to the second portion.

13. The three-dimensional object data generation apparatus according to claim 11, wherein the plurality of portions of the three-dimensional object comprises a first portion and a second portion, wherein, when a resolution level of a basic voxel group corresponding to the first portion is different from a resolution level of a basic voxel group corresponding to the second portion, the basic voxel group corresponding to the first portion and the basic voxel group corresponding to the second portion are expanded after a size of the basic voxel group corresponding to the first portion and a size of the basic voxel group corresponding to the second portion are normalized.

14. A three-dimensional object data generation apparatus comprising:

setting means for setting a basic voxel group defined using at least one voxel in accordance with a shape of a surface of a three-dimensional object on a basis of three-dimensional object data indicating the surface of the three-dimensional object using at least either a plurality of flat surfaces or a curved surface; and generation means for generating three-dimensional object data in which voxels are set inside the surface on a basis of the basic voxel group, wherein the setting means sets the basic voxel group smaller than the three-dimensional object, and generation means generates the three-dimensional object data in which voxels are set entirely within the surface by expanding the basic voxel group from an initial position located inside the surface of the three-dimensional object to another position which does not intersect with the surface of the three-dimensional object and setting mesh data representing the surface of the three-dimensional object, wherein the generation means expands the basic voxel group by repetitively providing the basic voxel group until the three-dimensional object is filled with voxels, and if gaps are caused between adjacent basic voxel groups after the basic voxel group is repetitively provided, the generation means copies an attribute value of outermost voxels of the basic voxel group to voxels in the gaps.

* * * * *